United States Patent

Murayama et al.

[11] Patent Number: 5,623,556
[45] Date of Patent: Apr. 22, 1997

[54] SYSTEM AND METHOD OF EXTRACTING BINARY IMAGE DATA

[75] Inventors: Masayoshi Murayama; Shigehiro Kajihara; Fumitaka Sato, all of Tokyo, Japan

[73] Assignee: Kabushiki Kaisha Toshiba, Kawasaki, Japan

[21] Appl. No.: 368,719

[22] Filed: Jan. 4, 1995

Related U.S. Application Data

[63] Continuation of Ser. No. 108,292, Aug. 19, 1993, abandoned, which is a continuation of Ser. No. 737,030, Jul. 29, 1991, abandoned.

[30] Foreign Application Priority Data

Jul. 31, 1990 [JP] Japan .................................. 2-201539

[51] Int. Cl.⁶ .................................................. G06T 9/00
[52] U.S. Cl. ........................................ 382/233; 358/261.4
[58] Field of Search ........................... 358/261.1, 261.3, 358/261.4, 261.2, 432, 453; 382/56, 232, 245, 233

[56] References Cited

U.S. PATENT DOCUMENTS

| | | | |
|---|---|---|---|
| 3,723,641 | 3/1973 | Heinrich et al. | 358/261.4 |
| 4,700,402 | 10/1987 | Okai et al. | 382/56 |
| 4,725,815 | 2/1988 | Mitchell et al. | 358/261.3 |
| 4,748,512 | 5/1988 | Armstrong | 358/261.1 |
| 4,760,461 | 7/1988 | Sato | 358/432 |
| 4,843,632 | 6/1989 | Lee et al. | 358/261.1 |
| 4,884,147 | 11/1989 | Arimoto et al. | 358/261.1 |
| 5,086,434 | 2/1992 | Abe et al. | 358/453 |

FOREIGN PATENT DOCUMENTS 63-33350 7/1988 Japan.

OTHER PUBLICATIONS

Japanese Patent Publication No. 63–33350 Hitoshi Miyai et al., "Coded Image Storage Apparatus," (NEC Corporation), published Jul. 5, 1988.

*Primary Examiner*—Michael T. Razavi
*Assistant Examiner*—Jon Chang
*Attorney, Agent, or Firm*—Finnegan, Henderson, Farabow, Garrett & Dunner, L.L.P.

[57] ABSTRACT

For each of multiple segments acquired by dividing a binary image by a predetermined under of lines, image data of a reference line corresponding to a start line of that segment is stored in an intermediate start table in association with data indicating a head coding position of the start line in code data acquired when the binary image is compressed. Based on the stored data, partial image extraction is executed.

5 Claims, 3 Drawing Sheets

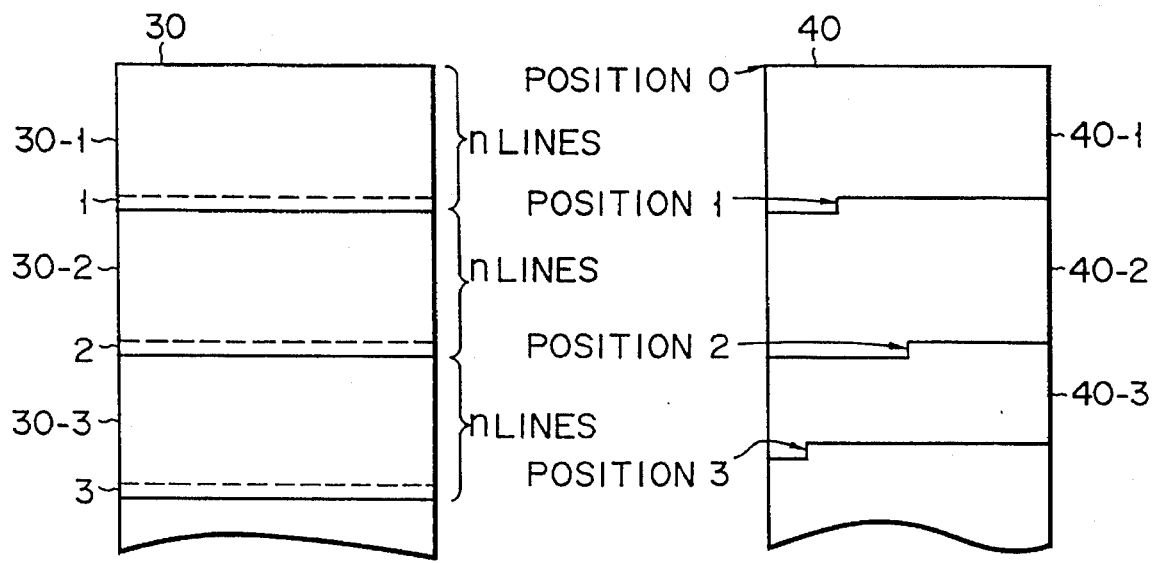

SYSTEM AND METHOD OF EXTRACTING BINARY IMAGE DATA

This application is a continuation of application Ser. No. 08/108,292, filed Aug. 19, 1993, now abandoned which is a continuation of application Ser. No. 07/737,030, filed Jul. 29, 1991, now abandoned.

BACKGROUND OF THE INVENTION

1. Field of the Invention

The present invention relates to a binary image data extracting a system and method for extracting part of large image data in a binary image compression/expansion apparatus.

2. Description of the Related Art

A binary image compression/expansion apparatus handling a great amount of binary image data usually encodes binary image data to speed up the data transfer. Typical coding systems used for this type of apparatus are the MH (Modified Huffman) system, MR (Modified Read) system and MMR (Modified MR) system.

To extract part of image data from a binary image coded by the MH, MR or MMR coding system, all code data are expanded and developed into the original image before the extraction.

According to the above method, however, a large amount of image data which does not directly concern the extraction must be developed. As the original image becomes larger, therefore, image expansion takes more time, and the image memory needs a larger capacity.

Examined Japanese Patent Publication No. 63-33350 discloses a method for dividing a binary image into segments and encoding a head line of each segment in the one-dimensional coding system. This method cannot however be used with the MMR system which encodes binary image data with every line having a correlation with multiple lines. This method also cannot cope with the MR system if the head line of each segment is coded in a two-dimensional coding system.

SUMMARY OF THE INVENTION

It is therefore an object of the present invention to provide a binary image extracting system and method capable of quickly extracting part of even a large binary image based on code data.

To achieve this object, a system for compressing and expanding a binary image according to the first aspect of the present invention comprises: means for dividing the binary image into multiple segments by a predetermined number of lines; coding position data storing means for storing image data of a reference line corresponding to a start line of each of the divided segments, in association with that data in code data acquired when the binary image is compressed which indicates a head coding position of the start line; and means for producing an image based on the data stored in the coding position data storing means.

A system for compressing and expanding a binary image according to the second aspect of the present invention comprises: means for dividing the binary image into multiple segments by a predetermined number of lines; coding position data storing means for storing image data of a reference line corresponding to a start line of each of the divided segments, in association with that data in code data acquired when the binary image is compressed which indicates a head coding position of the start line; and means for extracting part of the binary image based on the data stored in the coding position data storing means.

A system for compressing and expanding a binary image according to the third aspect of the present invention comprises: binary image compressing/expanding 10 means for executing a compressing process to produce code data based on data of a binary image and an expanding process to produce a binary image based on the code data; means for dividing the binary image into multiple segments by a predetermined number of lines based on data acquired by processing done by the binary image compressing/expanding means; coding position data storing means for storing image data of a reference line corresponding to a start line of each of the divided segments, in association with that data in the code data acquired when the binary image is compressed which indicates a head coding position of the start line; code data storing means for storing code data to be handled in the binary image compressing/expanding means; and means for extracting and expanding the code data stored in the code data storing means to produce an image, based on the data stored in the coding position data storing means at a time the binary image compressing/expanding means extracts part of the binary image.

According to the present invention, since image data of a reference line corresponding to the start line of an image segment is stored in a memory in association with that data in code data which indicates the head coding position of the start line, the image data of the reference line can be referred to when extracting part of an image or expanding image data corresponding to the desired extraction area. This feature can permit the use of the MMR system as well as the two-dimensional coding line in the MR system.

In particular, the binary image compressing/expanding means is designed to skip reading code data stored in the code data storing means to avoid expanding the unnecessary data, thus speeding up the image extraction.

The coding position data storing means stores image data of the reference line and data indicating the head coding position of the start line in the compressing process or expanding process based on the contents of line number holding means, byte number counting means, bit position holding means, reference line holding means and line number counting means all provided in the binary image compressing/expanding means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a conceptual diagram showing image data associated with an original image;

FIG. 3 is a conceptual diagram of two-dimensionally arranged code data associated with the image data shown in FIG. 2;

FIG. 4 is a conceptual diagram of an intermediate start table; and

DETAILED DESCRIPTION OF THE PREFERRED EMBODIMENTS

Figure 1:
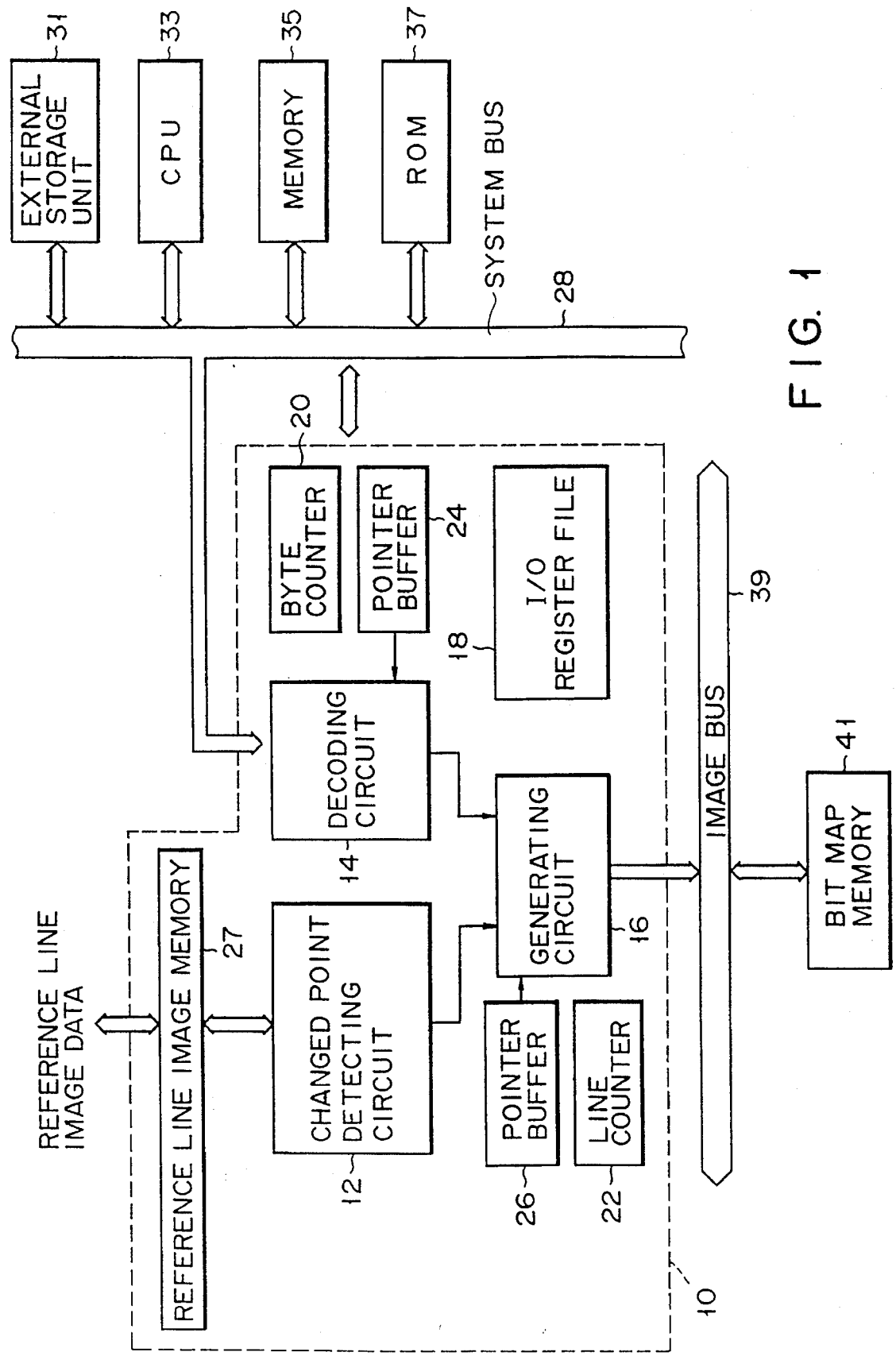
FIG. 1 is a block diagram illustrating the structure of a binary image compressing/expanding apparatus in a system using a binary image data extracting system according to one embodiment of the present invention.

FIG. 1 is a block diagram illustrating the structure of a binary image compression/expansion apparatus in a binary image data extracting system according to the present invention.

As shown in FIG. 1, a binary image compression/expansion apparatus 10 comprises a changed point detecting circuit 12, a decoding circuit 14, a generating circuit 16, an I/O register file 18, a byte counter 20, a line counter 22, pointer buffers 24 and 26 and a reference line image memory 27. The binary image compression/expansion apparatus 10 is connected via a system bus 28 to a CPU 33.

This system is provided with a memory 35, which stores code data to be sent to the binary image compression/expansion apparatus 10 in image expansion and which stores information as an intermediate start table 50 (code data storing means) to be described later. Image data used for compressing an image will be sent to this system by an image input apparatus (not shown), such as an ITV.

Figure 5:
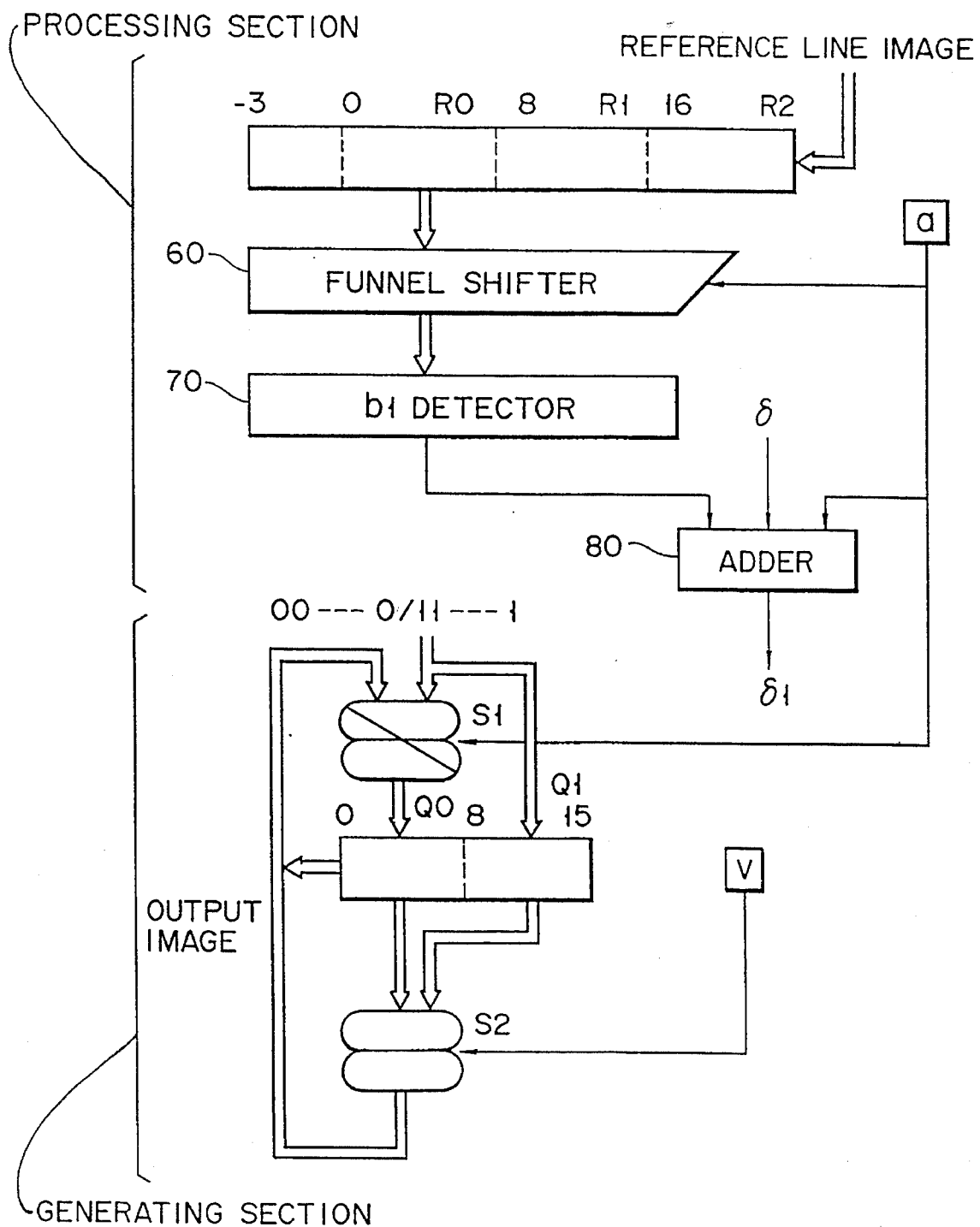
FIG. 5 is a detailed block diagram showing a generating circuit shown in FIG. 1.

The changed point detecting circuit 12 detects a changed point from image data on a line (reference line) immediately before a line stored in the reference line image memory 27 to be decoded or encoded. The decoding circuit 14 receives codes (code data) at the time of image expansion, or image data at the time of image compression, and decodes the data. Based on the changed point detected by the changed point detecting circuit 12 and the result of data decoding done by the decoding circuit 14, the generating circuit 16 generates image data in the image expansion, and generates code data in the image compression. The changed point detecting circuit 12 and the generating circuit 16 are described in detail in Unexamined Japanese Patent Publication No. 62-61980 filed by the same assignee as that of this application. FIG. 5 exemplifies the structure of the generating section of the binary image compression/expansion apparatus. In the following description, "a0" designating a changed point with its position described by the immediately previous code word, and "a1" is the first changed point on the right side of a0 on the coded line, whose position designates to be coded. "b1" is a changed point on the right side of a0 on the reference line, and changed in the same direction as a1 (from white to black, or vice versa). "δ" is a relative dot position. The changed point is where a dot is inverted from white to black, or vice versa. The reference line is a scan line immediately before a scan line (coding line) to be coded.

Part of the image data on the reference line is held in registers R2 to R0. Runs are generated in registers Q1 and Q0. "a" (pointer) specifies the position where generation of the run in the Q0 register starts. Reference line data right to $\underline{a}$ is fetched from a funnel shifter 60. Then the data is sent to a b1 detector 70 to acquire the bit position of the b1 bit. Further, an adder 80 calculates the last position of the run to be generated, i.e., adds b1, δ and $\underline{a}$ to obtain the position of a1.

Linking the runs will now be explained. The pointer $\underline{a}$ in the Q0 indicates the position where generation of the run starts. On the left side of a is the run already generated. A selector S2 selects the Q0 register. The selector S2 selects the Q0 register for the data on the left side of $\underline{a}$. The selector S2 sends a and the data on the right side of $\underline{a}$ as "0" to the Q0 register in generating a white run, and sends them as "1" in generating a black run. The Q1 register receives "0" (white) or "1" (black) both to be generated.

When the b1 bit is not detected an 8-bit run is generated with its last data in the Q1 register. Q0 is output in the next cycle, which completes the generation of the run. The selector S2 selects the Q1 register, and the run generation is repeated. The reference line data is moved from registers R2 and registers R1 to R1 and R0, respectively, and the next data is sent to register R2.

When b1 bit is detected, the run has already generated up to one dot before the position indicated by the out-put a1 of the adder. With the output of the adder renewed as "a," white and black runs are inverted, and processing to generate the next run is executed. Since the reference line is scanned in synchronism with the image generation, an image is produced in parallel to the detection of the b1 bit.

The I/O register file 18 holds various data used for the compression/expansion process in the binary image compression/expansion apparatus 10. This I/O register file 18 includes registers (line number holding means) which set the number of lines, n, for dividing an image into multiple segments. In the image expansion, the byte counter 20 counts the number of bytes of code data, starting with the head byte of that data. When the image is expanded, the pointer buffer 24 indicates the head bit position of the code in the code data where the decoding circuit 14 should start decoding. The line counter 22 counts the number of the lines up to the line number n for the divided segments set in the I/O register file 18. When the image is compressed, the pointer buffer 26 indicates the head bit position where the codes of code data are to be linked together to the generating circuit 16. The reference line image memory 27 holds image data of the reference line. The reference line image memory 27 and the point buffer 24 are connected to external units by buses, so that they can be accessed for data reading/writing through the buses. Likewise, the byte counter 20, line counter 22 and point buffer 26 are connected to external units by buses so as to be accessible for data read/write operation through the buses. An external storage unit 31 for storing code data is connected to the system bus 28, and a bit map memory 41 is connected via an image bus 39 to the generating circuit 16. There is therefore an exclusive display pipeline so that, at the time the expansion of data is executed, the code data from the external storage unit 31 is expanded by the binary image compression/expansion apparatus 10 and the image data is stored in the bit map memory 41. Also connected to the system bus 28 is a read only memory (ROM) 37 which stores firmware as coding position setting means to be described later.

The data structure in this embodiment will be described below. FIG. 2 shows image data which is divided into multiple segments, each segment having a predetermined number of lines, n. FIG. 3 shows the start position of code data in each segment. FIG. 4 illustrates an intermediate start table which stores reference line image data of the start lines in each segment and the start byte positions and bit positions of codes.

FIG. 3 illustrates the start positions of code data 40 in association with image data 30 shown in FIG. 2. In general, coded data, even when acquired by coding image data of the same length, has different lengths depending on the contents of the image data. There is no regularity on the coded data for the head positions (0, 1, 2 . . . ) of each divided segment 40-1, 40-2, . . . . The intermediate start table 50 shown in FIG. 4 stores the reference line corresponding to the head line of each divided segment 30-1, 30-2, . . . in the image data 30 in FIG. 2 in association with the byte position from the head in the code data 40 which indicates the head position (code start position) of each divided segment 40-1, 40-2 . . . shown in FIG. 3 and the bit position in that type. It is assumed that the image data of the reference line corresponding to the head line (coding line) in the first segment 30-1 has all the bits of the "0" indicating "white."

In the intermediate start table 50, the divided segments of the image data 30 are associated one to one with code data. In partially extracting an image from, for example, compressed image data, once the divided segment including the partial image to be extracted from the image data 30 is determined, is obtained from intermediate start table 50 the code start position of that segment in the code data 40 and decoding starts from that address. When decoding for the necessary number of lines is completed, the decoding will be terminated, thus ensuring efficient extraction of the required data.

The operation of this embodiment will now be described.

In the following description, the operation of partial expanding process (extraction of a partial image) in the binary image compression/expansion apparatus 10 will be explained referring to FIGS. 1 to 4.

To begin with, a description will be given of how to prepare the intermediate start table 50 in FIG. 4. First, the I/O register file 18 is accessed, and the number of lines, n, in the divided segment in the image data 30 is set. Intermediate start table 50 is prepared at the time of image compression when the original data is image data, and at the time of image expansion when the original data is code data.

when the image data or code data is input to the binary image compression/expansion apparatus 10, or more specifically, to the decoding circuit 14 therein, the compression process or expansion process is sequentially executed. Every time processing for one line is executed, the line counter 22 counts the number of lines processed. The byte counter 20 counts the number of bytes of the prepared code data (at the time of image compression) or the number of bytes of the input code data (at the time of image expansion).

when the count value of the line counter 22 reaches a value indicating the end of the processing for a predetermined number of lines (n), the binary image compression/ expansion apparatus 10 issues a CPU interrupt. At the time of image compression, the contents of the pointer buffer 26 specify the head bit position where codes of the next line should be linked. At the time of image expansion, the contents of the pointer buffer 24 specify the head bit position (code start position) where decoding for the next line should start.

In response to an I/O command from the CPU, the reference line data as well as the contents of the byte counter 20 and the contents of the pointer buffer 26 (at the time of image compression) or the contents of the pointer buffer 24 (at the time of image expansion) are fetched via the system bus 28. On the system side, data read out from the binary image compression/expansion apparatus 10 is sequentially stored in the intermediate start table 50. Here, the reference line data is image data of the reference line corresponding to the head line in the next divided segment to be processed.

The image data of the reference line is associated with the byte position from the head in the code data 40 and the bit position in that byte. The code data 40 originating from the compression/expansion process according to the contents of the intermediate start table 50 is also held (see FIG. 3).

Then, the processing in the binary image compression/ expansion apparatus 10 resumes. As the above-described processing is continuously performed for the entire image data, the intermediate start table 50 for the individual divided segments of the whole image is prepared.

A description will be given below of a specific operation to execute a partial expanding process (extraction of partial image) using the intermediate start table 50.

Extraction and expansion of image data are executed by reading out the code data 40, and data from the intermediate start table 50. The expanding process is executed starting with the divided segment preceding and closest to the desired extraction segment. Before the expansion process starts, therefore, the image data of the reference line corresponding to the head line in that divided segment and the code start position corresponding to this data are read out from the intermediate start table 50. The read-out pieces of data are sent over the system bus 28 to the binary image compression/expansion apparatus 10. In response to an I/O command from the CPU, the binary image compression/ expansion apparatus 10 stores the image data of the reference line into the reference line image memory 27, and sets the byte position indicating the code start position and the bit position in that byte into the byte counter 20 and pointer buffer 24, respectively.

when the expanding process is invoked and the code data 40 is input to the coding circuit 14, the byte counter 20 counts down for each 1-byte input. Reading of the input code data is skipped until the value of the byte counter 20 becomes "0." That is, no expanding process will be performed for the unnecessary code data located before the divided segment which includes the image to be extracted. When the code data is input piece by piece and the value of the byte counter 20 becomes "0," the byte including the head code data in the segment desired for image expansion has been fetched. The pointer buffer 24 now indicates the position in the same byte where decoding should start.

The changed point detecting circuit 12 detects a changed point of the reference line corresponding to the coding line (the head line in the divided segment) based on the reference line data stored in the reference line image memory 27. The decoding circuit 14 decodes data from the decoding start position specified by the contents of the pointer buffer 24. The generating circuit 16 produces an image in accordance with the result of the detection of the changed point in the detecting circuit 12 and the result of the decoding in the decoding circuit 14.

Thereafter, images are sequentially produced in accordance with the input code data. It is to be noted that the expansion process is executed only for the divided segment which includes a partial image to be extracted. When decoding of the necessary number of lines is completed in the middle of processing one divided segment, the expansion process will be terminated there.

In this manner, the image data of the reference line corresponding to the head line is stored in the intermediate start table 50 in association with information representing the code start position for each of multiple segments acquired by dividing an image by n lines. In extracting a partial image, therefore, the expansion processing is executed only for the divided segment that includes the partial image, based on the information in the table 50 which represents the code start position. As this system does not perform the expansion process for a vast amount of image data which does not directly concern image extraction, the partial image can be efficiently extracted without requiring a large-capacity image memory. Since the intermediate start table 50 holds the image data of the reference line in association with the information that indicates the code start position, the use of this data permits this embodiment to be applied to a system which codes data using the MMR system. Further, even in the MR system, it is unnecessary to limit the start line of each divided segment to a one-dimensional line. In addition, this embodiment may be modified so that the system side sends code data corresponding to the coding position stored in the intermediate start table to the binary image compression/expansion circuit which starts the expansion process immediately upon reception of the data. In this case, no counter is needed to skip reading the code data. Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A system which sequentially updates one of a plurality of lines of a binary image, which is part of an entire binary image, as a line for processing and generates an image of the line on the basis of relationships between the line and a reference line which immediately precedes the line in the binary image, said system comprising:

expanding means for expanding code data to produce the binary image based on binary image data of a reference line corresponding to a line to be expanded and based on data indicating a start position of the code data to be processed, the code data being a result of a compression of the entire binary image;

an intermediate start table for storing a plurality of data pairs, each of which is made up of image data of a reference line corresponding to a start line of one of a plurality of segments and coding position data corresponding to a head position of said one of the plurality of segments, the plurality of segments being obtained by dividing the entire binary image into a plurality of lines, the coding position data indicating a head coding position corresponding to a head position of each of the segments included in the code data obtained when the entire binary image is compressed;

code data storing means for storing the obtained code data; and control means for transferring a pair of the binary image data of the reference line and the coding position data, both of which are stored in said intermediate start table, to said expanding means and for causing said expanding means to expand the code data, which corresponds to the segments stored in the code data storing means.

2. A system which sequentially updates one of a plurality of lines of a binary image, which is part of an entire binary image, as a line for processing and generates an image of the line on the basis of relationships between the line and a reference line which immediately precedes the line in the binary image, said system comprising:

means for compressing binary image data to yield code data;

means for expanding the code data to produce the binary image, both the expanding and compressing based on a binary image data of a reference line corresponding to a line to be compressed and to be expanded and on data indicating a head position of the code data to be processed;

an intermediate start table in a memory for storing a plurality of data pairs, each of which is made up of image data of the reference line corresponding to a start line of one of a plurality of segments and coding position data corresponding to a head position of said one of the plurality of segments, the plurality of segments being obtained by dividing the entire binary image into a plurality of lines, the coding position data indicating a head coding position corresponding to a head position of each of the segments included in code data obtained when the entire binary image is compressed;

code data storing means for storing the obtained code data; and control means for transferring a pair of the binary image data of the reference line and the coding position data, both of which are stored in said intermediate start table, to said binary image compressing means or expanding means and for causing said means for expanding the binary image data to expand the code data, the code data corresponding to the segments being stored in the code data storing means.

3. A system according to claim 2, wherein said binary image compressing/expanding means includes:

reference line setting means for setting image data of said reference line of said start line of a segment immediately preceding and closest to a segment to be extracted;

coding position setting means for setting a head coding position of said start line corresponding to said reference line set by said reference line setting means; and means for skipping reading said code data stored in said code data storing means up to said coding position set by said coding position setting means, and expanding code data following a start position referring to said image data of said reference line set by said reference line setting means, thereby producing a partial image.

4. A system according to claim 3, wherein said binary image compressing/expanding means further comprises:

line number holding means for holding a line number for each of said divided segments of to-be-produced said binary image;

byte counting means for counting a number of bytes of processed code data;

bit position holding means for holding a head bit position of a code where processing should start;

reference line holding means for holding image data of a reference line corresponding to a line to be processed;

line number counting means for counting a number of lines processed; and means for storing said image data held in said reference line holding means and coding-position indicating data, specified by said number of bytes counted by said byte counting means and said head bit position held in said bit position holding means, into said coding position data storing means, when said number of lines counted by said line number counting means and to be subjected to a compressing process reaches said line number held in said line number holding means at a time of data compression.

5. A system according to claim 2, wherein said binary image compressing/expanding means comprises:
- line number holding means for holding a line number for each of said divided segments of said to-be-produced binary image;
- byte counting means for counting a number of bytes of processed code data;
- bit position holding means for holding a head bit position of a code where processing should start;
- reference line holding means for holding image data of a reference line corresponding to a line to be processed;
- line number counting means for counting a number of lines processed; and
- means for storing said image data held in said reference line holding means and coding-position indicating data, specified by said number of bytes counted by said byte counting means and said head bit position held in said bit position holding means, into said coding position data storing means, when said number of lines counted by said line number counting means and to be subjected to an expanding process reaches said line number held in said line number holding means at a time of expanding already-coded code data.

* * * * *

UNITED STATES PATENT AND TRADEMARK OFFICE
CERTIFICATE OF CORRECTION

PATENT NO. : 5,623,556
DATED : April 22, 1997
INVENTOR(S) : Masayoshi MURAYAMA et al.

It is certified that error appears in the above-indentified patent and that said Letters Patent is hereby corrected as shown below:

Title page, Item [57], in the Abstract, line 2, "under" should read --number--.

Claim 4, column 8, line 47, "to-be-produced said" should read --said to-be-produced--.

Signed and Sealed this

Twenty-third Day of September, 1997

Attest:

BRUCE LEHMAN

Attesting Officer

Commissioner of Patents and Trademarks